Sept. 3, 1935. W. CAMERON 2,013,403
CAN TESTING APPARATUS
Filed Oct. 20, 1932 2 Sheets-Sheet 1

Sept. 3, 1935.  W. CAMERON  2,013,403
CAN TESTING APPARATUS
Filed Oct. 20, 1932   2 Sheets-Sheet 2
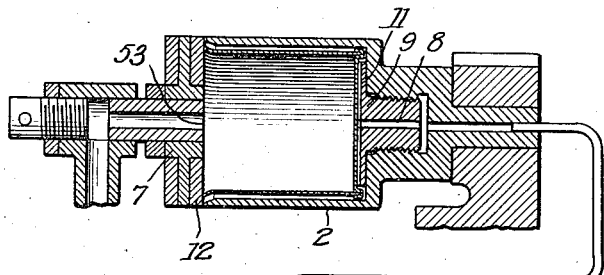
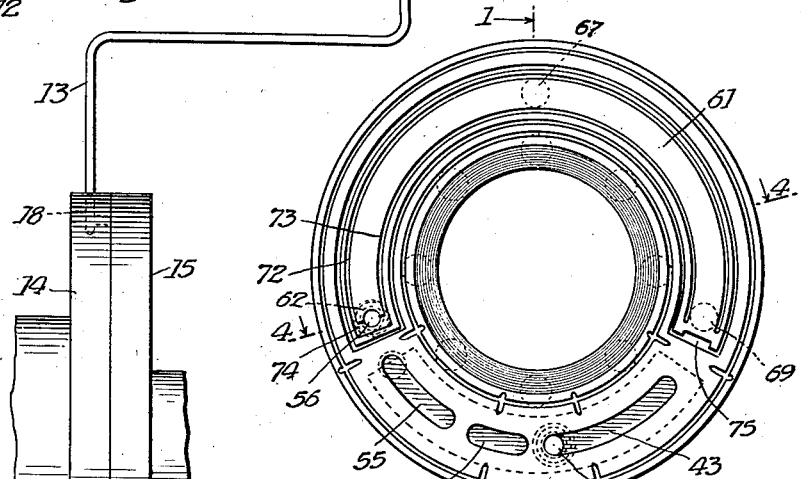
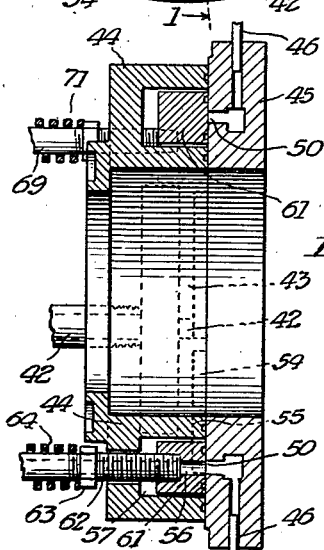
Inventor:
William Cameron
By Wilson, Dowell, McCanna & Lorch
Attys Patented Sept. 3, 1935

2,013,403

UNITED STATES PATENT OFFICE 2,013,403

CAN TESTING APPARATUS

William Cameron, Chicago, Ill., assignor to Cameron Can Machinery Co., Chicago, Ill., a corporation of Illinois Application October 20, 1932, Serial No. 638,728

8 Claims. (Cl. 73—51)

This invention relates to apparatus for testing cans and particularly to improvements in the apparatus shown in my two prior filed pending applications, Serial No. 331,845, filed January 11, 1929, and Serial No. 474,235, filed August 9, 1930.

The improvements consist principally in certain changes in the prior apparatus concerned with applying compressed air to the can interiors during the testing of the cans while yet employing vacuum on the can interiors to hold them by suction during their insertion into the testing chambers and their removal therefrom. The separating mechanism which is to be operated by the testing diaphragms shown in the present application is preferably that which is shown in the aforesaid applications, and not forming part of the present invention need not be herein shown and described.

Likewise the manner of feeding the cans into the testing wheel, shown in Fig. 1 of the present application, and the can mechanism for inserting the cans and withdrawing them from the testing chambers being the same as shown in the prior applications may be understood by reference to the specifications of those applications.

In general the object of the present invention is to provide improvements in testing apparatus of the character shown in the aforesaid prior applications and particularly in the matter of the use of compressed air for testing of the cans.

Other objects and advantages of the present invention will be revealed in the specification.

In the drawings:

Fig. 2 is a diagrammatic representation showing the connection between an individual testing chamber and the testing diaphragms;

Fig. 3 is a vertical sectional view on the plane of the line 3—3 of Fig. 1; and

Fig. 4 is a sectional view on the line 4—4 of Fig. 3.

Figure 1:
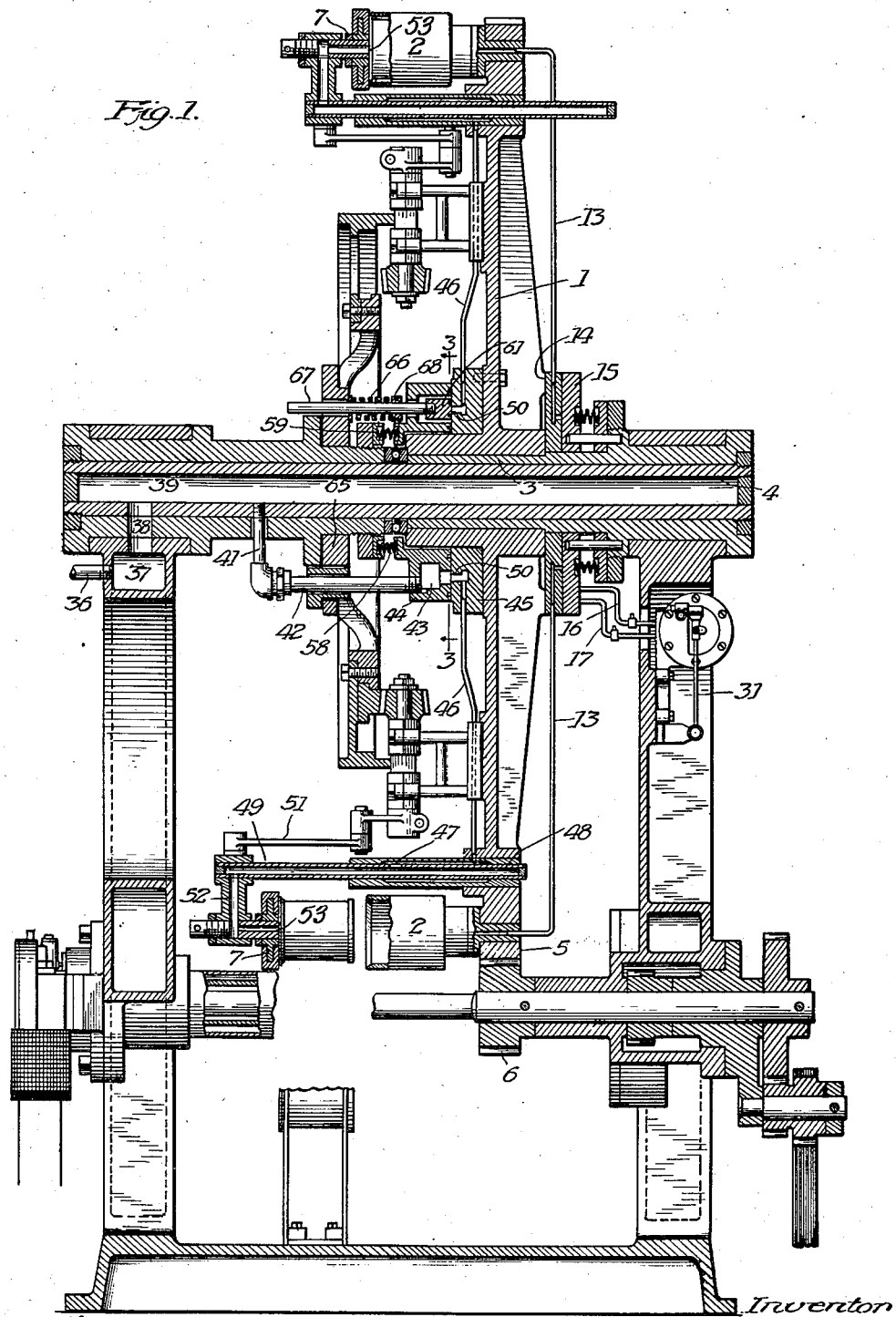
Fig. 1 shows a central vertical section of a rotary testing apparatus generally made in accordance with the aforesaid prior applications but carrying the improvements hereinafter described. The section through the charging valve in the middle of Fig. 1 is a little off vertical center, being at that point a section on line 1—1 of Fig. 3.

Referring now to the drawings, the testing wheel is provided with a web 1 on which are mounted a plurality of testing chambers 2, each of these chambers being so constructed that it is just slightly larger than the cans to be tested therein. The wheel itself is mounted for rotation on its bearing 3 which is supported on a stationary hollow shaft 4.

The periphery of the testing wheel is fashioned in the form of a ring gear 5 which meshes with the small gear 6 which is driven in any suitable manner, not forming a part of this invention.

The cans are supplied to the testing wheel at a point near the bottom thereof at which position they are gripped by the suction head 7 associated with each testing chamber for insertion into the chamber. However, such details are a part of the prior inventions above-mentioned and may be better understood by reference to those applications.

The construction of the testing chamber is best shown in Fig. 2, it consisting of the cylindrical receptacle 2 having one end open and the other end closed except for a passage 8 which leads through the bottom plate 9 which is threaded into the base of the receptacle and provided on its inner face with transverse grooves 11 for establishing communication between the passage 8 and the marginal portions of the testing receptacle. The bottom plate 9 is also raised somewhat so that it will flatly support the bottom of the cans to prevent distortion thereof when internal pressure is supplied to the cans. This bottom plate may be adjusted somewhat to make certain that the open end of the can is exactly flush with the open end of the receptacle so that both may be simultaneously sealed by a flat resilient rubber pad 12 carried on the suction head 7. From the bottom of each testing receptacle connected to its passage 8 there leads a pipe 13 which extends into a rotary plate valve 14 which rotates simultaneously with the testing wheel. Against the face of this rotating plate is a stationary plate 15 which carries passages for connecting through the tube 16 or the tube 17 to the pipes leading from the testing receptacles. For the sake of increasing the capacity of the machine it is provided with two testing diaphragms connected to pipes 16 and 17. Hence, alternate pipes 13 from the testing receptacle are connected by the plate valve 14 alternately to the tubes 16 and 17, that is, the short passage, for example 18, will register with the pipe 17 at the proper time for the test and the longer passage 19 will register at the proper time with the tube 16. The diaphragms 21 and 22 (see Fig. 2) are so mounted that they seal at their inner sides the chambers 23 and 24. Their outer faces are open to atmosphere and carry bosses 25 and 26 which normally just barely touch the adjustable screws 27 and 28 carried by the pendulums 29 and 31. The lower ends of these pendulums carry contact points 32 and 33 which upon distention of their respective diaphragms will cause electrical circuits to be established with a swing outwardly to contact with the binding posts 34 and 35. The electrical circuits thereby closed serve to operate the separating mechanism which is described in the foregoing applications.

Fig. 1 shows the great wheel and valve mechanism approximately in the position which the parts will have at the time a can has been withdrawn from a testing receptacle after being tested. At this time suction is being supplied from any suitable source through a pipe 36 and maintained constantly in a chamber 37 in the frame of the machine. The passage 38 connects it to the hollow interior 39 of the tube 40 and a short pipe 41 is connected to a pipe 42, and the latter to a chamber 43 in the stationary plate valve 44. This chamber has a rather elongated opening port, shown in Fig. 3, on its face over which the rotary plate valve 45 carried by the great wheel continuously moves. In the position of the wheel now being described the tube 46 at that time associated with the particular suction head shown in the bottom of Fig. 1 is connected by a passage 47 with a hollow interior 48 of a rod 49 which has just been slid outwardly by means of a pitman rod 51 whose mechanical movement is not a part of this invention but is described in the above-mentioned prior applications. A passage 52 completes the connection of vacuum to the passage 53 opening on the face of the suction head. At the time this tube 46 first registered with the elongated chamber 43 the can was, of course, seated and sealed in the receptacle. Suction was then applied and maintained while the pitman rod 51 was being moved to pull the suction head away from the receptacle. Following this position and after the can has been fully withdrawn continued rotation of the plate valve will move the tube 46 out of registration with the chamber 43 and into registration with another chamber 54 which is open to the atmosphere. Thus suction will be cut off from the particularly associated suction head and the can will then be allowed to drop into the separating and discharge mechanism which is described in the above-mentioned applications.

Further rotation of the great wheel will next bring this same suction head while it is so extended into position where the can delivery mechanism will place a can in front of it ready to be gripped by the suction and inserted into the same receptacle from which a can after test had just been withdrawn. At this moment the tube 46 will then register with another vacuum chamber 55 which is connected to the same vacuum source in any suitable manner, the particular manner of connection not being important and not being essential herewith. For example, it may be connected to pipe 42 or by suitable pipes to the hollow interior 39 of the shaft 4. However, so long as the tube 46 maintains registry with the elongated chamber 55 suction will be maintained at the suction head and the can will be gripped by its open end. The pitman rod will then be mechanically operated to push the suction head toward the receptacle to insert the can fully in the receptacle and to seal the receptacle and can simultaneously.

Thereafter the pipe 46 moves out of registration with chamber 55 onto a blank surface of the valve 44 and thence into registration with an aperture 56 provided in the plate valve. At this portion of the plate valve where the aperture 56 is provided there is set into the valve a movable segment 61, preferably formed of brass shown in cross-section in Fig. 4 and in elevation in Fig. 3. A suitable slot generally indicated as 57 provides the space for this brass segment.

It is desirable to have this portion of the valve separate from the other portions as in the lower half of the valve where vacuum is first applied, then cut off, and then reapplied only a slight pressure, such as is easily afforded by the springs 58 and 59, will suffice to establish proper working condition between the stationary valve 44 and the movable valve 45. However, as it is desired to maintain positive pressure ranging perhaps from fifteen to twenty-five pounds in the can interior and to seal it therein during the entire testing period, it is desirable to have the floating brass segment 61 pressed against the openings of the various tubes 46 in the movable plate valve 45. Hence, I thread the compressed air pipe 62 into the back of the segment in registry with the passage 56 and mount thereon against the collar 63 a compression spring 64 which is much stiffer than the springs 58 and 59. The rear end of this compression spring may then abut against any stationary part of the framework as, for example, a portion numbered 65 somewhat in the manner illustrated for putting compression on the spring 66 which surrounds a stud 67 which is threaded into the upper central part of the brass segment. This latter spring likewise is retained and adjusted for tension by means of a collar 68 mounted on the stud and supplies pressure to that portion of the segment adequate to maintain pressure in the cans under test. It will be noted by reference to Figs. 1, 3 and 4 that the portions of the segment intermediate its ends have a blank face which effects the seating of all the tubes 46 in communication with such surface and not at that time registering with the passage 56. A second stud 69 is threaded into the back of the brass segment in the same manner as is the stud 67, and is likewise provided with a compression spring for urging the brass segment very firmly against the movable plate valve 45.

Thus the plate valve 44 generally is urged toward the right, viewing Fig. 1, by weak springs 58 and 59 while the brass segment floating in the slot therein is urged strongly toward the right by the springs 64, 66 and 71.

The tube 46 leading to the can which has just been inserted into the receptacle is only momentarily in registration with the source of air supply which is connected in any suitable manner, not shown, to the pipe 62. However, this is sufficient to fully charge the can with the positive pressure which may be desired and further rotation of the valve 45 will carry the passage 46 onto the blank portion of the segment and will seal the can interior during the remainder of the test period. As the aperture 50 of this particular passage moves along the blank base of the brass segment there will be a tendency for some of the air from the can to leak back to the passage and escape from the aperture 50. However, it will be noted that the face of the segment is provided with a pair of grooves 72 and 73 which are shallow, being perhaps about ⅛ of an inch in depth and both of which communicate with a recess 74 which opens directly into the compressed air passage 56. Thus pressure equal to that which is maintained more or less constantly in the compressed air lines will be maintained in these two grooves 72 and 73 and if any air does escape from the aperture 50 it will meet with resistance from such air as may be escaping from the grooves 72 and 73 along the face of the brass segment. It is found that by employing these grooves as shown the initial pressure supplied to the can interiors may be maintained practically constant during the entire period of testing without much variation either upward or downward even though the line pressure in the pressure air lines may vary considerably, as it often will in most factories. This has a great advantage in securing greater accuracy in the testing of the cans. Just before the aperture 50 connected to any can under test moves off the opposite end of the brass segment, the valves 14 and 15 establish communication from the associated receptacle tube 13 and either one of the testing diaphragms, that is depending on whether the particular tube is communicated to a long passage 19 or a short passage 18. If there has been a leak in the can the sealed receptacle, which at the outset contained only atmospheric pressure, will at this time have a pressure somewhat in excess of atmospheric, and this pressure will be transmitted to either the chamber 23 or 24 and cause the distention of the associated diaphragms and the establishment of a necessary electrical circuit causes the selecting mechanism valve to deliver the leaky can into a special discharge chute for delivery of leaky cans. If there has been no leak the diaphragm will not be disturbed and the can will pass on into the discharge chute for good cans.

After the test at the diaphragm has been made it is necessary to supply vacuum to the can interior in order that it may be withdrawn by the suction head from its receptacle. Hence as the aperture 50 moves off the brass segment it momentarily registers with a notch 75 in the end of the segment which communicates to atmosphere. Compressed air is thus discharged and the aperture then moves on into registration with vacuum chamber 43 which enables suction to be applied to the suction head, whereafter the pitman rod 51 will then pull the can out of the receptacle and carry the can to a position where when vacuum is cut off from the suction head, as described heretofore, the can may then drop into the selecting mechanism and then be delivered through to the chute for good or leaky cans as is determined by the previous action of the testing diaphragm and the cooperative action of the selecting mechanism itself.

Since some cans may have extremely bad leaks as a result of which a considerably positive pressure may have accumulated in the associated can receptacle, it is important to protect the diaphragms from being too greatly distended by such leakage pressure. I have, accordingly placed ordinary pressure relief valves 76 in the lines leading to the testing diaphragms and adjust them so that the diaphragms cannot be subjected to any more pressure than they can safely withstand.

It should be understood that this invention is susceptible of being embodied in various forms different from the present disclosure which will yet retain and employ the principles of this invention as defined in the claims which follow.

I claim:

1. In a continuous rotary can body testing machine, a carrier wheel and testing receptacles mounted thereon, suction heads and reciprocating means therefor for gripping the cans to insert into and withdraw them from the receptacles, a rotating valve member provided with a plurality of separate apertures, pipes connecting said apertures to the suction heads, a second valve member resiliently urged with a light pressure against said first valve member and having apertures arranged to successively register with said first mentioned apertures, means for applying suction through the second member to the apertures in the first member, and a third valve member resiliently urged with much greater force against the first valve member provided with an aperture for supplying compressed air successively to the suction head pipe apertures, the third plate valve member serving to seal said suction pipe apertures during a large portion of their travel about the machine to hold compressed air in the can bodies being tested, and means actuated by pressure variations in the receptacles for detecting leaks in the can bodies.

2. In a continuous rotary can body testing machine, a carrier wheel and testing receptacles mounted thereon, suction heads and reciprocating means therefor for gripping the cans to insert into and withdraw them from the receptacles, a rotating valve member provided with a plurality of separate apertures, pipes connecting said apertures to the suction heads, a second valve member resiliently urged with a light pressure against said first valve member and having apertures arranged to successively register with said first mentioned apertures, means for applying suction through the second member to the apertures in the first member, and a third valve member resiliently urged with much greater force against the first valve member provided with an aperture for supplying compressed air successively to the suction head pipe apertures, the third plate valve member serving to seal said suction pipe apertures during a large portion of their travel about the machine to hold compressed air in the can bodies being tested, means for counteracting compressed air loss from the can bodies under test at the position of said valves without unrestrictedly connecting the can bodies to the source of compressed air supply, and means actuated by pressure variations in the receptacles for detecting leaks in the can bodies.

3. In a continuous rotary can body testing machine, a carrier wheel and testing receptacles mounted thereon, suction heads and reciprocating means therefor for gripping the cans to insert into and withdraw them from the receptacles, a rotating valve member provided with a plurality of separate apertures, pipes connecting said apertures to the suction heads, a second valve member resiliently urged with a light pressure against said first valve member and having apertures arranged to successively register with said first mentioned apertures, means for applying suction through the second member to the apertures in the first member, and a third valve member resiliently urged with much greater force against the first valve member provided with an aperture for supplying compressed air successively to the suction head pipe apertures, the third plate valve member serving to seal said suction pipe apertures during a large portion of their travel about the machine to hold compressed air in the can bodies being tested, grooves provided in the face of the third valve member communicating with the compressed air aperture and restrictedly arranged to counteract compressed air loss from the suction head pipes at the juncture of the first and third valve members, and means actuated by pressure variations in the receptacles for detecting leaks in the can bodies.

4. In a continuous rotary can body testing machine, a plurality of can body suction gripping elements and pipes connected thereto, a rotatable valve member in which said pipes terminate, a stationary valve member cooperating with the first member both being provided with apertures through which suction may be applied upon said pipes, a third valve member also cooperating with the first member and having an aperture therein for supplying compressed air to said pipes, and means connected separately to the second and third valve members for urging them resiliently against the first valve member with different degrees of force.

5. In a continuous rotary can body testing machine, a plurality of can body suction gripping elements and pipes connected thereto, a rotatable valve member in which said pipes terminate, a stationary valve member and means yieldingly urging it against the first valve member, apertures in both members for applying suction through the valve upon said pipes, and a third valve member carried by the second member provided with an aperture, a compressed air pipe connected to said aperture, the greater portion of the face of the third valve member being imperforate and arranged to seal a plurality of apertures in the first valve member, and means yieldably urging the third member against the first member with force greater than the pressure of the compressed air applied through the third member.

6. In a rotary can testing machine, a plurality of pipes for supplying compressed air to can body interiors while the latter are under leakage test, a rotatable valve having a surface provided with a plurality of apertures each individually connected with one of said pipes, a second valve member having an aperture to which is connected a compressed air pipe and having an imperforate surface arranged to seal a plurality of said pipe apertures when they have rotated past registration with said compressed air aperture, and a pair of grooves in the face of the second valve member communicating with the compressed air aperture therein and disposed on opposite sides of the path of travel of said apertures while they are sealed by said second valve member.

7. A can testing machine comprising a carrier, a series of testing receptacles carried thereby, a reciprocable head aligned with each receptacle, means for positioning a can body with the open end thereof in proximity to a head, means for applying suction through said head to the interior of said positioned body whereby the body is attached to the head, mechanism for moving the head into engagement with the aligned receptacle to position said body within said receptacle and seal the receptacle around the body, means for discontinuing said suction application and supplying air under pressure to the interior of said body, means for shutting off the air supply to and maintaining air pressure within said body, mechanism operable by air leakage from said body into the surrounding receptacle for detecting leaky bodies, means for releasing said pressure from and again applying vacuum to said body, and means for moving said head away from said receptacle to withdraw said body therefrom.

8. A can testing machine comprising a series of testing receptacles, a series of reciprocable heads aligned therewith, means for positioning can bodies with open ends in proximity to successive heads, means for applying suction through the heads to the interiors of said bodies whereby the bodies are attached to the heads, mechanism for moving the heads to position the bodies attached thereto within said receptacles and for compressing the heads against the receptacles to seal the same, means for shutting off the suction application to said bodies and introducing air under pressure through said heads into the bodies, means for maintaining the bodies in sealing relation to their respective heads during said pressure application, means rendered operable by escape of air pressure through said bodies for detecting leaky bodies, means for releasing the air pressure from the bodies and again applying suction to the interior thereof, and means for moving the heads away from the receptacles to withdraw the bodies therefrom.

WILLIAM CAMERON.